United States Patent

Klassen

[15] 3,702,052
[45] Nov. 7, 1972

[54] SWATH TURNER

[72] Inventor: John P. Klassen, 45593 Yale Road West, Chilliwack, British Columbia, Canada

[22] Filed: July 9, 1971

[21] Appl. No.: 161,861

[52] U.S. Cl. ................................................56/370
[51] Int. Cl. ...........................................A01d 79/00
[58] Field of Search ................56/370, 345; 171/101

[56] References Cited

UNITED STATES PATENTS 2,609,651  9/1952  Cymara ........................56/370
2,679,720  6/1954  Cymara ........................56/370

Primary Examiner—Antonio F. Guida
Attorney—Fetherstonhaugh & Co.

[57] ABSTRACT

Apparatus for inverting material deposited in a field as a windrow, the windrowed material being rotated by a substantially helically-shaped board which keeps a side edge of the windrow in contact with the field to serve as a pivot.

5 Claims, 7 Drawing Figures

PATENTED NOV 7 1972

SWATH TURNER

BACKGROUND OF THE INVENTION

My invention relates to a machine for turning over mown hay, grasses, or grain which has been laid in windrows by a swathing machine and which requires turning to ensure proper drying.

The various machines presently in use for this purpose have a number of disadvantages and included amongst these is their tendency to strew the material about in such a way as to make the swath or windrows uneven and therefore difficult to gather up by other harvesting machines such as a hay baler. When windrowed material is tossed about to an excessive extent, some of the more nutritious parts such as the leaves of alfalfa or clover, are dislodged and fall on to the ground in a position where they escape subsequent harvesting. Very often as the material is turned by conventional equipment, portions of the material become packed and moisture will be trapped so that the windrow will then take a much longer period to dry.

SUMMARY OF THE INVENTION

My invention overcomes the above as well as other disadvantages of conventional machines by providing a swath turner which achieves a particularly effective and positive turning action. The windrowed material, which may have become slightly compacted through lying on the ground in wet weather, is fluffed up slightly by the device but at the same time, is kept in an even row. A swath is turned by the present apparatus somewhat as if it was being advanced along a bolt thread of a very large pitch. This provides an unusually gentle turning action which is positive and continuous so that the swath remains unbroken over its entire area and not unduly disturbed except for a slight raising or fluffing effect which is desirable. During the entire turning movement, one side edge of the swath remains in contact with the ground and this ensures that the material is not moved longitudinally and also provides a pivot point about which the swath can be rotated by the turner. A deflector plate is included in the swath turner to ensure that the edge of the swath, which is moved through 180° during the turning action, is deflected in the right direction.

DESCRIPTION OF THE PREFERRED EMBODIMENT

Figure 1:
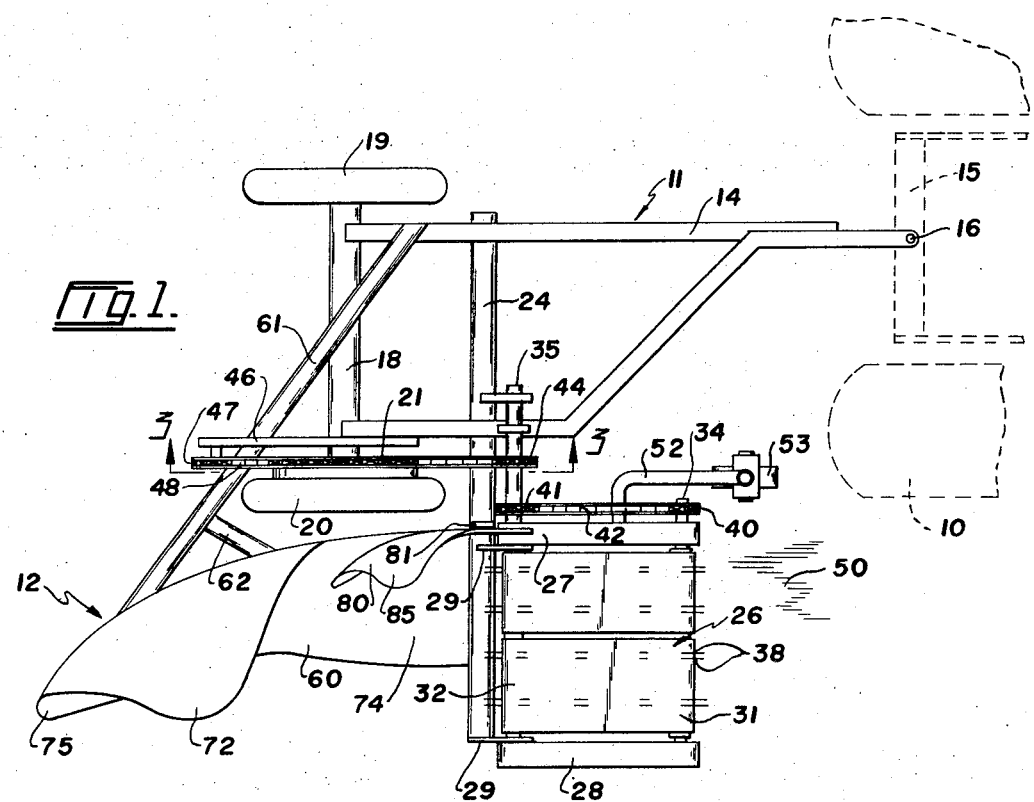
FIG. 1 is a plan of the swath turner, in accordance with the present invention.

Referring to the drawings, the numeral 10 indicates the rear portion of a tractor for towing a machine 11 on which the present swath turner 12 is mounted.

Figure 3:
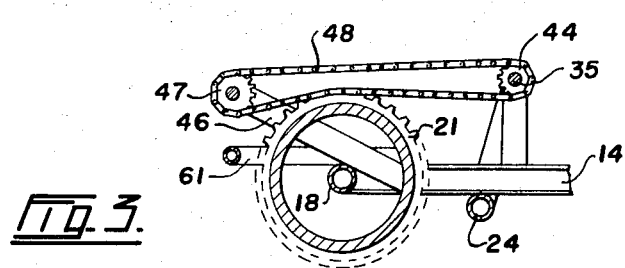
FIG. 3 is a transverse section, taken on the line 3—3 of FIG. 1.
Figure 4:
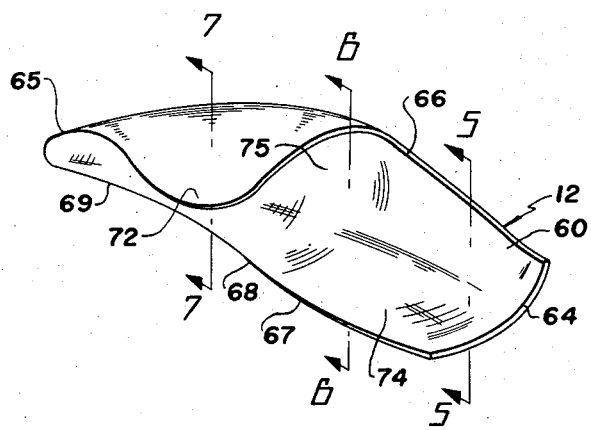
FIG. 4 is a perspective view of the mold board.

The present invention can be mounted on any one of a number of similar machines but the machine illustrated in the drawings and generally indicated by the numeral 11 will be seen to comprise a frame 14 which is adapted to be secured to a hitch 15 of the tractor 10 by a vertically disposed pivot pin 16. A rear axle 18 is fitted to the machine frame 14 and is provided with wheels 19 and 20. Wheel 20 is fitted with a large sprocket 21, see FIG. 3 only.

Mounted beneath the frame 14 forward of the rear axle 18 is a transversely extending shaft 24 which projects a suitable distance outwardly of the rear wheel 20. The laterally projecting end of the transverse shaft 24 serves to support a conventional pick-up conveyor generally indicated at 26. Conveyor 26 has inner and outer side members 27 and 28 which are secured to the shaft 14 by upstanding brackets 29. These brackets are fastened to the rear ends of the members 27 and 28 so that said members slope downwardly and forwardly to place the infeed end 31 of the conveyor slightly below the conveyor's discharge end 32. Shafts 34 and 35 are journalled in the ends 31 and 32 of the conveyor 26 and these shafts are fitted with suitable drums, not shown, over which a pair of conveyor belts 37 are trained. The belts 37 are fitted with a large number of suitably spaced rakes 38 which project outwardly from the surfaces of the conveyor belts.

Alongside the conveyor member 27, the shafts 34 and 35 are fitted and sprockets 40 and 41 which are connected by an endless chain 42, see FIG. 1. Shaft 35 projects inwardly over a part of the frame 14 and the laterally projecting end of this shaft is fitted with an idler sprocket 44. Mounted on a rearwardly extending bracket 46 carried by the axle 18 is an idler sprocket 47 which is connected to the sprocket 44 by a chain 48, see FIG. 3. The lower run of chain 48 is engaged by the large sprocket 21 on the wheel 20. Thus, as the machine 11 is towed behind the tractor 10, the wheels 19 and 20 are rotated clockwise as viewed in FIG. 2, and by virtue of the chain and sprocket drive means described above, the conveyor belts 37 are driven counterclockwise. Rotation of the conveyor belts in this direction causes the rakes 38 to sweep across the surface 50 of the ground as said rakes pass beneath the infeed end 31 of the conveyor. Any loose material lying on the ground in the path of the rakes will be swept up and carried over the conveyor to discharge from the conveyor end 32. In order to provide additional support for the forward end of the conveyor 26, a forwardly extending frame member 52 is secured to the side member 27 and the front end of this member is fitted with a ground engaging caster 53.

The swath turner generally indicated at 12 comprises a mold board 60 which is secured to the frame 14 by suitable support bars 61 and 62. Preferably, the mold board is formed from a sheet of wear and corrosion resistant metal which prior to being shaped is substantially rectangular. Thus, the board 60 has a front edge 64, a rear edge 65, a top edge 66, and a bottom edge 67. Edge 67 is bevelled slightly from a point indicated at 68 and located intermediate the length of the board, to the rear edge 65 to provide an inclined lower edge 69. Generally speaking, the board 60 is helical, for example, the board is dished adjacent the front edge 64 but the transverse curvature decreases slightly towards the rear edge 65. The substantially helical mold board has a rounded corner 72 formed at the intersection of the edges 65 and 66 and this rounded corner widely overhangs the remainder of the board. For descriptive purposes, the board 60 will be considered as having a leading portion 74 and a trailing portion 75. Portion 74 extends across the board from point 68 to the front edge 64 and portion 75 includes the remainder of the board from the same point to the rear edge 65. Thus, the portions 74 and 75 are both dished or transversely curved but portion 75 is also widely flared as if formed by being wrapped around a cylindrical surface. Obviously, there is no demarcation line between the merging portions 74 and 75 and the curving and flaring is continuous from end to end of the mold board.

Figure 2:
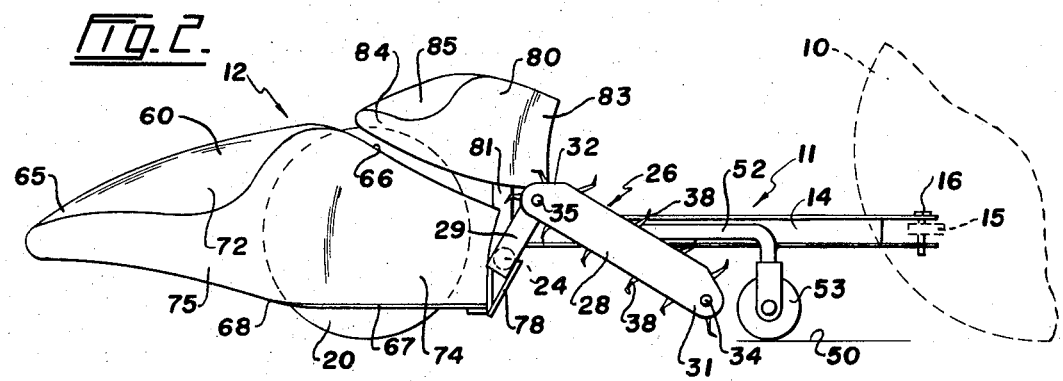
FIG. 2 is a side elevational view.

The front edge 64 of the mold board is secured to the transverse shaft 24 by brackets 78, one only shown, in FIG. 2, the lower edge 67 of the board being spaced a short distance inwardly of the outer member 28 of the pickup conveyor. The bars 61 and 62 support the mold board so that it is disposed at an angle to the conveyor 26 or, in other words, so that the roller corner 72 of the board is in appropriate alignment with the member 28. Near the shaft 24, the lower edge 67 of the board is roughly parallel to the ground surface but said lower edge gradually climbs above the surface of the ground with the lower edge portion 69 being upwardly inclined at a relatively deep angle. The rolled corner 72 of the board is supported above the ground a distance only slightly less than the width of the conveyor 26.

The swath turner 12 also includes a deflector plate 80 which is mounted on a post 81 carried by the frame 14. Plate 80, like the board 60, is formed of heavy sheet metal and has the general appearance of a miniature mold board 60 which it resembles in many respects. For example, plate 80 has a leading portion 83 which may be slightly curved and a trailing portion 84 which has a rounded corner 85 flared outwardly in the same manner as the corner 72 of the mold board. As illustrated in the drawings, the deflector plate 80 is spaced above the top edge 66 of the bard but it will be understood that the deflector plate may be in actual contact with the board if desired, or may even be formed as an integral part of the mold board. The important thing is that the deflector plate 80 forms an upward extension for the board with the corner 85 being approximately aligned with the corner 72.

Figure 5:
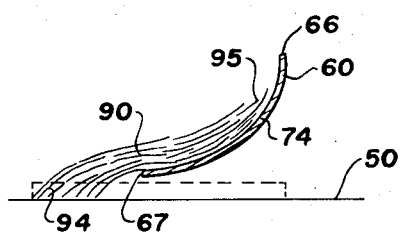
FIG. 5 is a vertical section taken on the line 5—5 of FIG. 4, which rear parts of the board purposely omitted.
Figure 6:
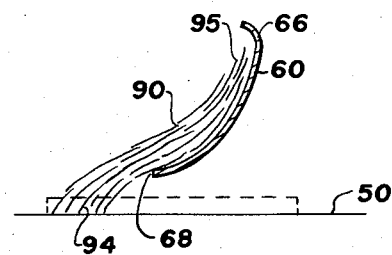
FIG. 6 is another similar vertical section taken on the line 6—6 of FIG. 4.
Figure 7:
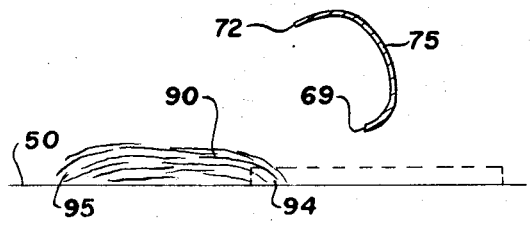
FIG. 7 is still another similar vertical section taken on the line 7—7 of FIG. 4.

The operation of the swath turner can best be understood by reference to FIGS. 5, 6 and 7, in which the numeral 90 represents a swath or windrow of hay for example. Tractor 10 is driven alongside the swath 90 with the conveyor 26 aligned with the swath. The counter rotating conveyor then picks up one end of the swath and feeds it towards the conveyor discharge end 32. As this is done, the swath 90 is not moved longitudinally but is merely raised so that the conveyor and the swath turner can pass beneath the windrow.

The hay swath falls from the conveyor 26 partly on to the front end 64 of the mold board and partly on to the surface 50 which, in this instance, is that of a hay field, see FIG. 5. When in this position, the swath 90 has a lower edge 94 in contact with the ground while the remainder of the swath is curved and tilted upwardly as shown. Further sliding movement of the board 60 beneath the swath 90, raises and curves the swath to the position shown in FIG. 6, while the swath edge 94 remains in firm contact with the ground. As the board moves still further relative to the swath, the swath wipes along the board and is caused to roll in a spiral motion until it drops on to the ground as shown in FIG. 7. Corner 72 of the mold board is last in contact with the swath and this part of the board gives a final thrust to the swath which is deposited on the ground as a flattened windrow. At all times during this turning action, the lower side edge 94 of the swath remains in contact with the field surface 50 and, in fact, said edge serves as a pivot about which the swath is rotated by the mold board. Thus, the swath is turned so that the former upper or dried surface is underneath and the former lower or wet surface is uppermost. It will be noted that, as this turning action takes place, the swath is moved one swathed width to one side, the original position of the swath being shown in dotted lines in FIGS. 5, 6 and 7.

There may be times when the swath 90 will be found to be of greater than normal width due to having become scattered somewhat by the wind during drying. This slight scattering may cause the side edges of the swath to become ragged or uneven. When this occurs, the swath edge 95 tends to move over the top edge 66 of the mold board. However, the swath is compacted to some extent and the material will pass from the mold board up into contact with the deflector plate 80. Plate 80 deflects the swath edge 95 outwardly in the proper direction so that all the material will be spirally rotated by the mold board and none will pass over the top of the board to be scattered and perhaps lost.

From the foregoing, it will be seen that a swath turner has been provided which is particularly effective in inverting any material which is laid in windrows for drying. The windrows or swath are turned by the substantially helical mold board without being strewed about as usually happens with conventional machines used for this purpose. At the same time, the conveyor 26 fluffs or teds the material slightly as is desirable but does so without forming gaps along the lengths of the swath. The swath turner can be made right or left hand, viz, it can invert the swath to the right of its path of travel or to the left thereof if desired. Regardless of how the swath is turned, one side edge of the windrow remains in contact with the ground at all times so that the desired spiral rotation can be imparted to the material by the simply constructed mold board.

I claim:

1. In a machine adapted to be moved parallel to a swath of material lying upon the surface of a field and including a pickup conveyor for elevating the swath, a swath turner comprising a mold board mounted on the machine rearwardly of the pickup conveyor to move beneath the swath, said mold board having a leading portion and a trailing portion, said leading portion being adapted to receive the swath from the pickup conveyor and to support a major portion of the width of the swath and having a bottom edge over which a lower side edge of said swath projects into contact with the field surface, said trailing portion including a rounded corner overhanging and projecting laterally beyond the bottom edge of the leading portion whereby the swath is progressively tilted to pivot about the lower side edge thereof and fall on to the field surface in inverted position.

2. A swath turner as claimed in claim 1, in which said mold board is disposed at an angle to the longitudinal axis of the swath whereby said swath is moved laterally substantially one swath width as it is inverted.

3. A swath turner as claimed in claim 2, and including a deflector plate mounted above the mold board to engage an upper side edge of the swath.

4. A swath turner as claimed in claim 3, in which said deflector plate is helically shaped substantially in the same manner as the mold board.

5. In a machine adapted to be moved parallel to a swath of material on the surface of a field and including a pickup conveyor for elevating the swath, a swath turner comprising a mold board mounted on the machine rearwardly of the pickup conveyor to receive the elevated swath, said mold board having a leading portion and a trailing portion, said leading portion supporting a major portion of the width of the swath and having a bottom edge over which a lower side edge of said swath projects into contact with the field surface, said trailing portion including a rounded corner overhanging and projecting laterally beyond the bottom edge of the leading portion whereby the swath is progressively tilted to pivot on the lower side edge thereof and fall on to the surface in an inverted position, a deflector plate mounted above the mold board to engage an upper side edge of the swath, said deflector plate being helically shaped substantially in the same manner as the mold board.

* * * * *